Figures 1, 2:
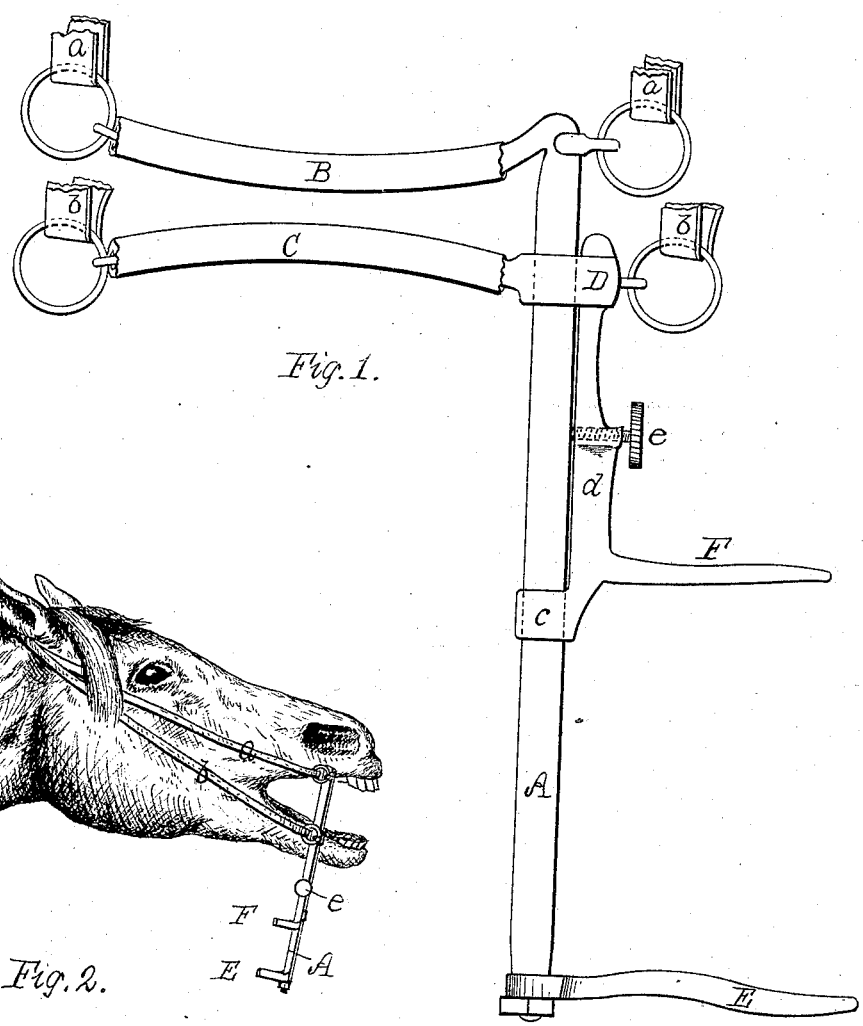

(No Model.)

J. A. GREEN.
DEVICE FOR OPENING ANIMALS' MOUTHS.

No. 314,527. Patented Mar. 24, 1885.

Witnesses.
H. E. Lodge.
A. F. Hayden.

Inventor.
John A. Green.
F. Curtis, Atty.

UNITED STATES PATENT OFFICE.

JOHN ADAMS GREEN, OF WALTHAM, MASSACHUSETTS.

DEVICE FOR OPENING ANIMALS' MOUTHS.

SPECIFICATION forming part of Letters Patent No. 314,527, dated March 24, 1885.

Application filed July 17, 1884. (No model.)

*To all whom it may concern:*

Be it known that I, JOHN ADAMS GREEN, a citizen of the United States, residing at Waltham, in the county of Middlesex and State of Massachusetts, have invented certain new and useful Improvements in Devices for Opening Animals' Mouths; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This device is for the purpose of opening, and securing open for a time, the mouths of animals for drenching, surgical, or other purposes, as may be desired; and it consists of a double-barred bit secured by cheek-straps passing over the animal's head, each of said bits being provided with a handle, and one of them mounted on a slide that is movable on a rod with which the other is integral. It also consists in the combination of the above-mentioned bars and handles, the lower bar of the bit, being movable, sliding upon a straight metal rod and secured in any position thereon by a set-screw.

The drawings represent, in Figure 1, a view of the device embodying my invention, while Fig. 2 is a diagram showing it secured to an animal's head.

In these drawings, A represents a metal rod, preferably rectangular in cross-section, and of a length adapted to the purpose to which it is to be applied. At the upper extremity of this rod I have attached a double-barred bit covered with leather, rubber, or some other proper material to prevent irritation of the animal's mouth. The upper bar, B, is securely attached to the rod A, and provided at both ends with rings, through which passes a cheek-strap, $a$. The lower bar, C, is similarly provided with rings and a cheek-strap, $b$, while to permit the bar C to move toward or away from the upper bar, B, as may be desired, I have formed a square shoulder, D, which snugly fits the rod A and retains it in proper adjustment and parallel with the fixed bar B.

To induce movement of the bar C upon the rod A, I have securely fitted a handle, E, to the lower extremity of the latter, while a second handle, F, is secured to the rod A by a shoulder, $c$, which fits, incloses, and moves upon the latter and with the lower bar, C, to which it is fastened by the rod $d$.

To enable the bar C to be entered upon the rod A, the handle E is to be removable and maintained in place by a nut turning on a screw-thread formed on the end of the rod A, as shown in Fig. 1 of the drawings.

In one instance in apparatus hitherto employed for a similar purpose the lower bar, corresponding to C in the drawings, has been moved by a nut and screw-thread formed on the rod A; but there are objections to this, as in case an animal is uneasy and resists it is difficult, if not impossible, to move the lower bar and relieve the animal at once, while with my present device by relaxing the set-screw $e$ the bar C can be instantly let go and the animal apparently has a simple bit in its mouth, when, after being quieted, a second attempt may be made by operating the device as follows: The bit formed of the bars B C is inserted in the animal's mouth and the two cheek-straps $a$ $b$ are passed over the head and properly tightened to retain the bit in position. The operator then places his thumb on the fixed handle E, while the fingers grasp the movable one, F, and their contraction, gradually or otherwise, moves the bar C from B, separating the two, and drawing the jaws of the animal apart, when, if it resists, the operator at once lets go, and the bars are directly closed by the action of the jaws thereon. After a time the attempt may again be made. Now, the action of a screw-threaded rod prevents this, and it is difficult, after once opening the mouth, if the animal becomes contrary, to relax the lower bar and relieve it of the pressure. After the animal has yielded, the bars are securely retained apart by turning up the set-screw $e$, and the animal's jaws are in a proper position for an operation of any kind in which the hand has to be introduced within the mouth.

Hitherto this apparatus has simply been temporarily placed in the mouth for a single operation; but my present device, formed of a double-barred bit with a movable lower bar, and the whole secured by cheek-straps to the animal's head, may be left in place for any length of time and without any inconvenience. The position of the straps $a$ and $b$, which meet at a point just behind the ears, permits movement of the lower bar, C, which swings in an arc whose radius is the strap b.

In practice I have found this device to be of great efficacy in the treatment of thoroughbred or other high-spirited and restive horses.

I claim—

1. As a means for opening the mouths of animals, the combination, with the bit composed of the bars B C, of the fixed and movable handles E F, whereby motion of the lower bar, C, is effected upon the rod A, or its equivalent, substantially as described.

2. The combination, with the rod A, fixed bar B, and handle E, of the movable bar C, united to the handle F by the rod d, provided with a set-screw, e, as and for the purposes set forth.

In testimony whereof I affix my signature in presence of two witnesses.

JOHN ADAMS GREEN.

Witnesses:
H. E. LODGE.
A. F. HAYDEN.